3,120,522
PRODUCTION OF CHLORINATED CYANURIC ACID
Raymond A. Olson, Westfield, N.J., and Erik Saller, Stamford, Conn., assignors to FMC Corporation, New York, N.Y., a corporation of Delaware
No Drawing. Filed Aug. 8, 1961, Ser. No. 129,955
3 Claims. (Cl. 260—248)

This invention relates to an improvement in the process of producing chlorinated cyanuric acid, and more particularly to such an improvement whereby the crystal size of the precipitated, chlorinated cyanuric acid product is increased.

One method for producing chlorinated cyanuric acid is described in U.S. Patent No. 2,969,360 issued to R. H. Westfall on January 24, 1961. In this process, cyanuric acid is fed along with aqueous alkali (in molar ratio corresponding to the number of chlorine atoms to be attached) and chlorine to an aqueous reaction zone which is maintained at a pH no higher than 9. The feed ingredients are added in virtually stoichiometric proportions. The crude chlorinated cyanuric acid precipitates from the solution as a solid slurry.

This reaction is preferably carried out in two stages. In the first stage, a substantial part of the reaction takes place at pH's of 5 to 9. The resultant reaction mixture containing partially chlorinated product is removed from this first stage and passed into a second reaction zone along with additional chlorine, where the final reaction occurs at pH's of 1.5 to 3.5. The product is removed from the second reaction zone in the form of a slurry, and the solid product is then separated, washed, and dried.

The steps of separating the crude chlorinated cyanuric acid from the aqueous medium and washing this product have given rise to a serious problem. The chlorinated cyanuric acid crystals obtained from this reaction average less than 500 square microns per cross sectional area (SMCSA) for trichlorocyanuric acid and 150 SMCSA for dichlorocyanuric acid, and as such are difficult to separate from the mother liquor and to wash. Effective filtration of the crystals on a commercial scale and in high yields is thus rendered difficult. Improper or incomplete washing of the product because of its small crystal size leads to poor removal of impurities, with subsequent contamination of the chlorinated cyanuric acid product.

It is an object of the present invention to form chlorinated cyanuric acid crystals of a sufficiently large size so that they can be readily separated from the mother liquor, and readily washed free of impurities.

These and other objects will be readily discernible from the following description.

It has now been determined, quite unexpectedly, that chlorinated cyanuric acid crystals having a greater size than 500 SMCSA can be produced by adding to the reaction mixture from which these crystals are formed, from 50 to 1000 p.p.m., based on the amount of chlorine which reacts, of a chlorinated hydrocarbon containing 1 to 6 carbon atoms and having not more than 1 hydrogen atom in its molecule. These chlorinated hydrocarbons can be used as crystal promoters either separately or in admixture with one another.

The chlorinated hydrocarbons of the present invention can be aliphatic, cycloaliphatic, or aromatic, and can be saturated or unsaturated. Among the compounds which have been found useful are carbon tetrachloride, chloroform, perchloroethylene, trichloroethylene, hexachloropropylene, hexachloro-1,3-butadiene, hexachlorocyclopentadiene, and hexachloroethane.

A source of chlorinated hydrocarbons which has been found useful in this application is the impurities or by-products obtained in the process of producing chlorine by diaphragm type cells. These are obtained by scrubbing dry gaseous chlorine with liquid chlorine at about $-30°$ C. prior to compression of the gaseous chlorine. Typical diaphragm cells which produce these chlorinated hydrocarbons are Hooker cells, single and double cathode Vorce cells, and Nelson cells. These cells and their operation are described in the Encyclopedia of Chemical Technology by R. E. Kirk and D. F. Othemer, volume 1, pages 364–372. The chlorinated hydrocarbon impurities derived from these cells are normally termed "gunk" and comprise on the average about 50% chloroform, 20 to 25% carbon tetrachloride, 10% perchloroethylene, and 10 to 15% hexachloroethane. In operation, pure chlorine such as liquified chlorine which has been produced from a diaphragm type cell is added to the sodium cyanurate solution which contains about 50 to 1000 p.p.m. of this "gunk," based on the total chlorine entering into the reaction. This supplies the required chlorine and maintains the required amount of chlorinated hydrocarbons necessary for yielding large crystals of the chlorinated cyanuric acid product.

In practicing the present invention the chlorinated hydrocarbons can be added at any point during the course of the reaction. The reaction is carried out preferably in a continuous manner and in two stages. In the first stage, the aqueous alkali, cyanuric acid and gasified liquid chlorine are fed continuously into a reaction zone maintained at a pH between about 5 and 9, and most preferably between 6.5 and 8.5, at a temperature between $5°$ C. and $40°$ C. The reaction mixture containing partially chlorinated cyanuric acid product is continuously removed from the reaction zone and fed into a second reaction zone along with additional chlorine, the second reaction zone being maintained at a pH between 1.5 and 3.5 and at a temperature between $5°$ C. and $20°$ C. The crystal product is continuously removed from the second reaction zone in the form of a slurry, and the desired solid product is separated, washed and dried.

The chlorinated hydrocarbons can be added most conveniently during the second stage of chlorination by introducing them in the required amounts into the reaction medium through a separate orifice in the reaction zone. In the laboratory they are most conveniently added during the second stage of the chlorination reaction, although first-stage addition is possible.

Although the two-stage continuous reaction is the preferred embodiment of the process, the reaction can be carried out in a single stage process either semi-continuously or continuously. If the operation is semi-continuous, the alkali is added in increments, along with the chlorine, so that the pH never exceeds 9. The final pH of the batch is adjusted from 1.5 to 3.5 at which point the chlorocyanuric acid precipitates and can be recovered. The chlorinated hydrocarbons should be present in the reaction medium during the precipitation of the chlorinated cyanuric acid.

Where a continuous single stage chlorination is performed, the reaction zone is maintained at a pH of 1.5 to 3.5 and the reactants are fed in and products continuously removed from the one reaction zone. Because of the difficulty in controlling three streams of reactants and the desirability of maintaining the ratio of alkali to cyanuric acid most accurately, the alkali and cyanuric acid are preferably fed into the reaction mixture together, and the pH controlled by the ratio at which the chlorine is added.

When making dichlorocyanuric acid, the pH of the reaction mixture preferably is maintained between about 6 and 9 in the first stage of the two-stage reaction. About one-half of the chlorine is introduced during the first step. When making trichlorocyanuric acid, about 60 to 65% of the total chlorine preferably is used in the first step of the reaction, and similarly the pH is maintained at about 6 to 9. The reaction mixture overflowing from the first stage of the chlorination is fed continuously into the second stage of reaction, along with fresh chlorine. In this second stage, the chlorine feed is adjusted so that the pH of the reaction mixture is maintained at 1.5 to 3.5. In this pH range, the solubility of the dichlorocyanuric and trichlorocyanuric acids in the reaction liquor is low, yet the absorption of chlorine is sufficiently rapid so that chlorination goes essentially to completeness with the precipitation of the chlorinated acids. By introducing the presently defined class of chlorinated hydrocarbons into the reaction mixture either during the first or second stage of the chlorination, a product slurry is withdrawn containing large crystals of the chlorinated cyanuric acid product.

The following examples are included by way of illustration of the present invention and are not to be deemed limitative thereof. Examples 1 through 4 described the preparation of trichlorocyanuric acid while Examples 5 and 6 describe the preparation of dichlorocyanuric acid.

EXAMPLE 1

Two-Stage Continuous Chlorination

Two cylindrical reactors, one with a capacity of 0.5 liter and the other a capacity of 1.25 liters, were fabricated from 90 mm. O.D. Pyrex tubing 205 and 305 mm. in length, respectively. The reactors were spherical at the bottom and enclosed with a rubber stopper at the top. Each reactor contained a side arm for continuous overflow of the slurry product. The slurry feed tube and chlorine inlet tube, pH electrodes, thermometer, bearing for the stirrer, and the vent tube were all assembled as an integral part of the rubber stopper. Dry Ice-acetone baths were used to maintain the temperature in both reactors at 15 to 20° C. The feed slurry was introduced in the first reactor through a straight tube extending close to the upper suface of a stirrer blade by means of a Sigmamotor pump, Model T-68. Chlorine was introduced through a tube drawn to a tip, so that the chlorine impinged on the stirrer blades. The paddle shaped stirrer blades were rotated at about 1400 r.p.m. The pH measurements were made with a glass-calomel electrode assembly immersed in the reactor slurry. Vent gas from both reactors was passed through scrubbers containing NaOH to absorb $Cl_2$ and $CO_2$. The feed slurry was prepared by adding purified cyanuric acid to 6 weight percent sodium hydroxide solution to give a 3.0 mole ratio of caustic to cyanuric acid. This resulted in a 9.2% solution of trisodium cyanurate. The run was started by filling the first reactor (0.5 liter) with feed solution and adding chlorine until the pH dropped to about 5.0. The feed slurry was then pumped in at a constant rate of about 23 ml./minute. Pure chlorine was fed into the mixture at a rate of about 1.54 gm./minute to maintain the pH at 5.0. The reaction mixture of the first-stage reactor was permitted to constantly overflow into the second-stage reactor (1.25 liters capacity) and chlorine was introduced into the second-stage reactor at about 0.77 gm./minute to maintain the pH at about 2.5. The average retention times in the first and second-stage reactors were 22 and 55 minutes respectively.

Two identical runs were carried out using the above procedure and equipment. In Run "A," no crystal promoter was added to the second-stage reactor. In Run "B," chlorination "gunk" was added to the second-stage reactor at 15 minute intervals. The "gunk" was introduced in a total amount equal to 1000 p.p.m. of the total chlorine which reacted in the system.

The product slurry produced in each of the second stage reactors continuously overflowed into receivers from which it was periodically filtered to separate the solids from the mother liquor. The solids were washed with water and dried at 110° C. in a forced-draft oven. The dry product in each case was tested for available chlorine and found to contain 91.5%. This indicated that the product was essentially pure trichlorocyanuric acid. When the processes had reached a steady state of operation, the yield of chlorinated cyanuric acid in each case was found to be 91% based on the cyanuric acid feed. The vent gases contained only 0.8% of the chlorine feed and a $CO_2$ content was found equivalent to 0.5% of the cyanuric acid feed. Microscopic examination of the trichlorocyanuric acid slurries revealed that the crystals of Run "A" had an average cross sectional area of 500 square microns while the crystals in Run "B" had an average cross sectional area of 5000 square microns. The slurry from Run "A" settled slowly and was difficult to filter and wash. The slurry from Run "B" settled rapidly and was easily separated from the mother liquor and washed.

EXAMPLE 2

Two-Stage Continuous Chlorination With Addition of Crystal Promoters

A chlorination was carried out similarly to Example 1, Run "B," except that in the place of the "gunk," perchloroethylene was added in an amount equal to 100 p.p.m. of the total chlorine which reacted in the system. The resulting trichlorocyanuric acid crystals had an average cross sectional area of 4,000 square microns. The slurry settled rapidly and was easily separated from the mother liquor.

EXAMPLE 3

Two-Stage Continuous Chlorination With Addition of Crystal Promoters

A chlorination was carried out similar to Example 1, Run "B," except that in place of the "gunk," trichloroethylene was added in an amount equal to 500 p.p.m. of the total chlorine which reacted in the system. The resulting trichlorocyanuric acid crystals averaged 7,000 square microns per cross sectional area. This slurry settled rapidly.

EXAMPLE 4

Two-Stage Continuous Chlorination With Addition of Crystal Promoters

Chlorination was carried out similar to Example 1, Run "B," except that in place of the "gunk," hexachloropropylene was added in an amount equal to 500 p.p.m. of the total chlorine which reacted in the system. The resulting trichlorocyanuric acid crystals had an average cross sectional area of 2,000 square microns. This slurry settled rapidly, although not as rapidly as those of Examples 1, Run "B," 2 and 3.

EXAMPLE 5

Two-Stage Continuous Chlorination

Two cylindrical reactors, one with a capacity of 0.5 liter and the other a capacity of 1.25 liters, were fabricated from 90 mm. O.D. Pyrex tubing 205 and 305 mm. in length, respectively. The reactors were spherical at the bottom and enclosed with a rubber stopper at the top. Each reactor contained a side arm for continuous overflow of the slurry product. The slurry feed tube and chlorine inlet tube, pH electrodes, thermometer, bearing for the stirrer, and the vent tube were all assembled as an integral part of the rubber stopper. Dry Ice-acetone baths were used to maintain the temperature in both reactors at 15 to 20° C. The feed slurry was introduced in the first reactor through a straight tube extending close to the upper surface of a stirrer blade by means of a Sigmamotor pump, Model T-68. Chlorine was introduced through a tube drawn to a tip, so that the chlorine impinged on the stirrer blades. The paddle shaped stirrer blades were rotated at about 1400 r.p.m. The pH measurements were made with a glass-calomel electrode assembly immersed in the reactor slurry. Vent gas from both reactors was passed through scrubbers containing NaOH to absorb $Cl_2$ and $CO_2$. The feed slurry was prepared by adding purified cyanuric acid to 6 weight percent sodium hydroxide solution to give a 2.02 mole ratio of caustic to cyanuric acid. This resulted in a 10.6% mixture of disodium cyanurate. The run was started by filling the first reactor (0.5 liter) with feed solution and adding chlorine until the pH dropped to about 7.0. The feed slurry was then pumped in at a constant rate of about 13 ml./minute. Pure chlorine was fed into the mixture at a rate of about 0.62 gm./minute to maintain the pH at 7.0. The reaction mixture of the first stage reactor was permitted to constantly overflow into the second state reactor (1.25 liters capacity) and chlorine was introduced into the second stage reactor at about 0.50 gm./minute to maintain the pH at about 2.5. The average retention times in the first and second stage reactors were 38 and 96 minutes respectively.

Two identical runs were carried out using the above procedure and equipment. In Run "A," no crystal promoter was added to the second-stage reactor. In Run "B," perchloroethylene was added to the second-stage reactor in an amount equal to 100 p.p.m. of the total chlorine which reacted in the system.

The product slurry produced in each of the second-stage reactors continuously overflowed into receivers from which it was periodically filtered to separate the solids from the liquor. The solids were washed with water and dried at 110° C. in a forced-draft oven. The dry product in each case was tested for available chlorine and found to contain 71.0%. This indicated that the product was essentially pure dichlorocyanuric acid. When the processes had reached a steady state of operation, the yield of the chlorinated cyanuric acid in each case was found to be 80% based on the cyanuric acid feed. The vent gases contained less than 0.1% of the chlorine feed and a $CO_2$ content was found equivalent to 0.2% of the cyanuric acid feed. Microscopic examination of the dichlorocyanuric acid slurries revealed that the crystals in Run "A" had an average cross sectional area of 150 square microns while the crystals in Run "B" had an average cross sectional area of 800 square microns. The slurry from Run "A" settled slowly and was difficult to filter and wash. The slurry from Run "B" settled rapidly and was easily separated from the mother liquor and washed.

EXAMPLE 6

*Single-Stage Continuous Chlorination*

A cylindrical reactor, with a capacity of 0.8 liter, was fabricated from 90 mm. O.D. Pyrex tubing 205 mm. in length. The reactor was spherical at the bottom and enclosed with a rubber stopper at the top. The reactor contained a side arm for continuous overflow of the slurry product. The slurry feed tube and chlorine inlet tube, pH electrodes, thermometer, bearing for the stirrer, and vent tubes were all assembled as an integral part of the rubber stopper. A Dry-Ice-acetone bath was used to hold the temperature at about 15° C. The feed slurry was introduced through a feed tube extending close to the upper surface of a stirrer blade by means of a Sigmamotor pump, Model T–68. Chlorine was introduced through a tube drawn to a tip, so that chlorine impinged on the stirrer blade. The paddle-shaped stirrer was rotated at about 900 r.p.m. The pH measurements were made with a glass-calomel electrode assembly immersed in the reactor slurry. Vent gas from the reactor was passed through a scrubber containing NaOH to absorb $Cl_2$ and $CO_2$. The feed slurry was prepared by adding purified cyanuric acid to a 5.5 weight percent sodium hydroxide solution to give a 2.02 mole ratio of caustic to cyanuric acid. This resulted in a 9.0% solution of disodium cyanurate. The run was started by filling the reactor with water and then feeding disodium cyanurate solution and chlorine simultaneously to maintain the pH at 2.5. The feed slurry was pumped in at a constant rate of 12 ml./minute. Pure chlorine was fed into the mixture at a rate of about 1.05 gm./minute to hold the pH at about 2.5. The average retention time was about 67 minutes.

Two identical runs were carried out using the above procedure and equipment. In Run "A," no crystal promoter was added to the reactor. In Run "B," perchloroethylene was added to the reactor in an amount equal to 100 p.p.m. of the total chlorine which reacted into the system.

The product slurry produced in each of the reactors continuously overflowed into receivers from which it was periodically filtered to separate the solids from the mother liquor. The solids were washed with water and dried at 110° C. in a forced-draft oven. The dried product in each case was tested for available chlorine and found to contain 69.8%. This indicated that the product was essentially dichlorocyanuric acid. When the processes had reached a steady state of operation, the yield of chlorinated cyanuric acid in each case was found to be 88.8%. The vent gases contained only 0.2% of the chlorine feed and $CO_2$ content was found equivalent to 0.3% of the cyanuric acid feed. Microscopic examination of the dichlorocyanuric acid slurries revealed that the crystals in Run "A" had an average cross sectional area of 150 square microns, while the crystals in Run "B" had an average cross sectional area of 800 square microns. The slurry of Run "A" settled slowly and was difficult to filter and wash. The slurry from Run "B" settled rapidly and was easily separated from the mother liquor and washed.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing an acid from the group consisting of dichlorocyanuric acid, trichlorocyanuric acid, and mixtures thereof, by reaction of cyanuric acid, aqueous alkali, and chlorine in an aqueous reaction mixture, the improvement which comprises adding a chlorinated hydrocarbon having 1 to 6 carbon atoms and containing no more than 1 hydrogen atom in the molecule in amounts of about 50 to 1000 p.p.m., on the basis of the amount of chlorine which reacts, to said aqueous reaction medium, whereby the crystal size of said acid product is increased 4 to 10 times over the size of corresponding acid product crystals precipitated in the absence of said chlorinated compound, and recovering said acid product from said aqueous reaction mixture.

2. The process of claim 1 in which the chlorinated hydrocarbon is added in amounts of 100 to 500 p.p.m.

3. In the process of producing a compound of the group consisting of dichlorocyanuric acid, trichlorocyanuric acid, and mixtures thereof, which comprises feeding cyanuric acid, aqueous alkali in a molar ratio to the cyanuric acid corresponding to the number of chlorine atoms to be attached to the cyanuric acid, and a separate stream of chlorine continuously to an aqueous reaction zone in which the pH is maintained between 5 and 9 and the temperature between 5° C. and 40° C., continuously withdrawing a portion of the reaction mixture and feeding it with additional chlorine to a second reaction zone in which the pH is maintained between 1.5 and 3.5 and the temperature between about 5° C. and 20° C., continuously withdrawing reaction product from the second reaction zone, and recovering the precipitated chlorinated cyanuric acid from the withdrawn reaction mixture, the improvement which comprises adding a chlorinated hydrocarbon having 1 to 6 carbon atoms and containing no more than one hydrogen atom in the molecule in amounts of about 50 to 1000 p.p.m., on the basis of the amount of chlorine which reacts, to a reaction zone whereby the crystal size of said acid is increased 4 to 10 times over normally precipitated acid.

References Cited in the file of this patent

UNITED STATES PATENTS

| | | |
|---|---|---|
| 2,913,460 | Brown et al. | Nov. 17, 1959 |
| 2,969,360 | Westfall | Jan. 24, 1961 |
| 3,040,044 | Hirsch et al. | June 19, 1962 |